United States Patent [19]

Höhne

[11] 4,367,270

[45] Jan. 4, 1983

[54] ASBESTOS DIAPHRAGMS FOR ELECTROCHEMICAL CELLS AND THE MANUFACTURE THEREOF

[75] Inventor: Karl Höhne, Erlangen, Fed. Rep. of Germany

[73] Assignee: Siemens Aktiengesellschaft, Munich, Fed. Rep. of Germany

[21] Appl. No.: 185,432

[22] Filed: Sep. 9, 1980

[30] Foreign Application Priority Data

Sep. 20, 1979 [DE] Fed. Rep. of Germany ....... 2938069

[51] Int. Cl.³ .............................................. H01L 2/16
[52] U.S. Cl. .................................... 429/251; 428/443; 427/115; 427/58; 427/443.2
[58] Field of Search ..................... 427/115, 443.2, 243, 427/244, 58; 429/251, 41; 428/443; 162/155

[56] References Cited

U.S. PATENT DOCUMENTS

| | | | |
|---|---|---|---|
| 3,583,891 | 7/1971 | Hacker et al. | 162/155 |
| 3,625,770 | 12/1971 | Arrance et al. | 427/115 |
| 4,007,059 | 2/1977 | Witherspoon et al. | 429/251 |
| 4,233,347 | 11/1980 | Lim et al. | 429/251 |

FOREIGN PATENT DOCUMENTS

| | | | |
|---|---|---|---|
| 52-66929 | 6/1977 | Japan | 429/251 |
| 1213472 | 11/1970 | United Kingdom | |
| 143848 | 5/1961 | U.S.S.R. | 429/251 |

*Primary Examiner*—Michael R. Lusignan
*Assistant Examiner*—Richard Bueker
*Attorney, Agent, or Firm*—Kenyon & Kenyon

[57] ABSTRACT

The invention relates to a method for the manufacture of diaphragms for electrochemical cells by impregnating asbestos paper with an organic plastic, and has as its principal object the development of such a method in a manner such that asbestos diaphragms which have high mechanical strength and are also cost-effective can be manufactured in efficient production. According to the invention, it is provided for this purpose to treat asbestos paper made by extrusion with a solution of polyvinylchloride or polysulfone in an organic solvent. The diaphragms prepared by the method acocrding to the invention are particularly suitable as cover layers in fuel cells with an alkaline electrolyte.

5 Claims, No Drawings

ASBESTOS DIAPHRAGMS FOR ELECTROCHEMICAL CELLS AND THE MANUFACTURE THEREOF

BACKGROUND OF THE INVENTION

The present invention relates to a method for the manufacture of diaphragms for electrochemical cells by impregnating asbestos paper with an organic plastic, and to asbestos diaphragms prepared by such a method.

In addition to sufficient porosity and high chemical resistance to the media used, diaphragms for electrochemical cells must, in particular, also exhibit high mechanical strength. Accordingly, it is known to use in fuel cells asbestos diaphragms which contain, for example, high-purity asbestos fibers and plastics, in which the plastic is a binder of methacrylic acid ester, polysulfones, chlorosulfonated polyethylene or chloroprene in amounts of 0.5 to 6% by weight, in particular, 1.5 to 3% by weight, referred to the weight of the asbestos fibers (British Patent No. 1,213,472). In the preparation of the asbestos diaphragms, the plastic is added to the asbestos fibers in the form of an aqueous dispersion.

U.S. Pat. No. 3,583,891 describes, for use in electrochemical cells, particularly fuel cells, a gas-tight membrane of high mechanical strength of asbestos or carbon material in fiber form and a plastic binder in which, in the fabrication of the membrane from the fiber material, a butadiene-styrene-acrylonitrile copolymerizate is added to the former (copolymerizate content of 6 to 15% by weight, referred to the fiber material) and wherein the nitrile groups of the copolymerizate are saponified to carboxyl groups after the membrane has been formed.

The methods mentioned are not well suited for the efficient manufacture of asbestos diaphragms for electrochemical cells, however, since they are relatively expensive. In general, the manufacture of diaphragms with an asbestos fiber base also is known, where asbestos paper is impregnated with a plastic material and is subsequently heated to remove the solvent or dispersing agent for the plastic material.

SUMMARY OF THE INVENTION

It is an object of the present invention to develop a method of the above-mentioned type in such a manner that, starting with asbestos paper, asbestos diaphragms which have high mechanical strength and are cost-effective can be manufactured in efficient production.

According to the present invention, this and other objects are achieved by treating asbestos paper made by extrusion with a solution of polyvinylchloride or polysulfone in an organic solvent.

Essentially, two types of commercial asbestos paper are available which differ as to their method of manufacture. The one type is produced by a casting process, while the other type is produced by an extrusion process. The asbestos paper made by the casting process has the disadvantage that it is relatively expensive. Asbestos papers made by the extrusion process are considerably cheaper (their cost is only about 5% of the papers made by the casting process). However, in these latter asbestos papers so strong a tendency for gas leaks occurs, evidently due to anisotropic strength behavior, that they cannot be utilized in electrochemical cells for safety reasons.

It now has been found surprisingly that the strength behavior of asbestos paper made by the extrusion process can be increased by impregnating it with a polyvinylchloride or polysulfone solution to such a degree that it then can be used in electrochemical cells.

In the method according to the present invention, a plastic solution having a concentration of about 2 to 8% by weight is advantageously employed. Although tetrahydrofuran preferably serves as the solvent, trichloroethylene, dichloromethane or acetone, for example, may also be used. The asbestos diaphragms preferably are made in such a manner that the asbestos paper is immersed in the plastic solution for about 5 to 15 minutes.

Asbestos diaphragms made according to the method of the present invention contain, in general, about 5 to 15% by weight plastic, i.e., polyvinylchloride or polysulfone, referred to the total weight of the diaphragm. With a plastic content larger than 15% by weight, the electric resistance of the diaphragms increases, and with a content less than 5% by weight, the mechanical properties become poorer.

Asbestos diaphragms according to the present invention are found to be gas-tight if used, for example, in an $H_2/O_2$ fuel cell with an alkaline electrolyte at the high operating temperature of 93° C., even after far more than 500 hours. These diaphragms also show no appreciable degradation of their electrochemical properties.

DETAILED DESCRIPTION OF THE INVENTION

The invention is explained in greater detail with the aid of the following, non-limiting examples.

EXAMPLE I

Preparation of Diaphragms

For the preparation of asbestos diaphragms, commercially available asbestos paper made by extrusion is immersed for 10 minutes in a 4.3% solution of polyvinylchloride (PVC) or polysulfone in tetrahydrofuran. Subsequently, the asbestos paper is freed of excess drops of solution by shaking and is dried in air at room temperature. This is followed by post-drying in a photo press at about 80° C. for about 30 minutes. The asbestos diaphragms obtained in this manner have a plastic content of about 10% by weight.

EXAMPLE II

Determination Of The So-Called "Bubble Point"

For determining the gas-tightness of diaphragms, a hollow body is employed which is provided with an opening and a gas feeding tube, the opening of which is closed off by an asbestos diaphragm. The asbestos diaphragm is supported on the outside by a nickel screen and a perforated plate following thereon. The entire arrangement is immersed in a beaker filled with water, and after a dwelling time of about 15 minutes, hydrogen is fed to the hollow body through the gas feeding tube with increasing pressure until the first gas bubbles are observed at the diaphragm, i.e., when gas passes through the diaphragm.

EXAMPLE III

Determination Of The So-Called "Bursting Point"

To determine the mechanical strength behavior of the diaphragms, the above-described arrangement is used, with the exception that the asbestos diaphragm is not supported (i.e., neither by a support screen nor by a perforated plate). The hydrogen pressure is then increased until the diaphragm bursts by the sudden formation of cracks, i.e., becomes leaky.

EXAMPLE IV

Determination Of The Permeability

The arrangement described also serves for determining the permeability of the diaphragm to electrolytic liquid or water. In this case, water under pressure is fed to the hollow body through the gas feeding tube. The pressure is generated by a water column of 88.7 cm in a burette. The permeability is determined by the amount of water passing through the diaphragm (area: 12.6 $cm^2$).

The results of the above tests are summarized in the following Table wherein the values given are average values and the pressures are difference pressures.

|  | "Bursting Point" [bar] | "Bubble Point" [bar] | Permeability [$cm^3/cm^2 \cdot h \cdot bar$] |
|---|---|---|---|
| Asbestos diaphragm, untreated | 0.39 | >4.0 | 65 |
| Asbestos diaphragm, with 10% PVC | 0.68 | >4.0 | 57 |
| Asbestos diaphragm, with 10% polysulfone | 0.75 | >4.0 | 50 |

As can be seen from the table, cracks form (bursting point) in the asbestos diaphragms according to the invention only at higher pressures. If these pressures are taken as a measure of the mechanical strength, the latter is higher in the diaphragms according to the present invention by about 75 to 95%, i.e., almost doubled, as compared to untreated diaphragms. With other abestos papers it was possible to achieve, using polysulfone, improvements of up to nearly 400%.

The "bubble point" is above 4 bar in the untreated asbestos diaphragms as well as in the diaphragms according to the present invention.

The flow resistance in the pores of asbestos diaphragms should be as small as possible so that, for example, the water formed at the anode in $H_2/O_2$ fuel cells can be transferred into the electrolyte space with a pressure drop as small as possible. Too high a pressure drop would lead to flooding of the electrode. With a current of, for example, 1 $A/cm^2$, 0.6 ml water are formed per hour and $cm^2$ electrode area in the oxidation of hydrogen. In order to discharge this amount of water with a pressure drop of 0.1 bar, the permeability of the diaphragms must be at least 6 $cm^3 cm^2.h.bar$.

As can be seen from the table, the permeability of asbestos diaphragms is substantially above the above-mentioned value, so that the slight lowering caused by the impregnation is not noticeable as a disadvantage. In addition, further investigations have shown that the impregnation also changes the electric resistance only slightly, i.e., increases it slightly.

EXAMPLE V

Electrochemical Properties

To determine the electrochemical properties of the asbestos diaphragms according to the present invention, PVC-containing diaphragms are tested in a 3-cell $H_2/O_2$ fuel cell battery with supported electrodes and free electrolyte. Raney nickel-titanium electrodes serve as anodes and sedimented doped silver electrodes serve as cathodes. The active surface of the electrodes is 340 $cm^2$. 8 m KOH serves as the electrolyte, and the operating pressures (of $H_2$ and $O_2$) are 2 bar.

The cell voltage/current density characteristics recorded during the operation of the battery show no difference from those of batteries with untreated asbestos diaphragms, i.e., the electrical properties are not changed by the impregnation. At an operating temperature of 83° C., the following electric resistances are measured, for example, at the individual cells of the battery: 0.74, 0.70 and 0.72 mohm. These values also correspond to those of fuel cells with untreated asbestos diaphragms.

The above-described fuel cell battery is otherwise also found to be gas-tight. No gas leaks occurred even at an operating temperature of 93° C. and after 530 hours of operation.

The asbestos diaphragms according to the present invention find application particularly in fuel cells with alkaline electrolytes. In addition, however, they may also be used, for example, in electrolysis apparatus. If used in fuel cells or fuel cell batteries, these asbestos diaphragms can be used not only as cover layers for the electrodes but also as membranes in so-called gap evaporators, in which the water formed in the electrochemical reaction is removed from the electrolyte liquid.

What is claimed is:

1. A method for the manufacture of gas-tight diaphragms for electrochemical cells by impregnating asbestos paper with an organic plastic, comprising treating asbestos paper made by extrusion with a solution of a plastic member selected from polyvinylchloride and polysulfone in an organic solvent.

2. The method according to claim 1 wherein the concentration of said plastic in said organic solvent is from about 2 to 8% by weight.

3. The method according to claim 1 wherein the organic solvent is tetrahydrofuran.

4. The method according to claim 1 wherein the treating comprises immersing the asbestos paper in the plastic solution for about 5 to 15 minutes.

5. A gas-tight diaphragm for electrochemical cells consisting essentially of asbestos paper made by extrusion and containing from about 5 to about 15% by weight thereof plastic selected from polyvinylchloride and polysulfone.

* * * * *